US011142982B2

(12) United States Patent
Evirgen et al.

(10) Patent No.: US 11,142,982 B2
(45) Date of Patent: Oct. 12, 2021

(54) UNDISTURBED SAMPLER FOR GRANULAR SOIL

(71) Applicant: ANADOLU UNIVERSITESI REKTORLUGU, Eskisehir (TR)

(72) Inventors: Burak Evirgen, Eskisehir (TR); Mustafa Tuncan, Eskisehir (TR); Ahmet Tuncan, Eskisehir (TR)

(73) Assignee: ANADOLU UNIVERSITESI REKTORLUGU, Eskisehir (TR)

( * ) Notice: Subject to any disclaimer, the term of this patent is extended or adjusted under 35 U.S.C. 154(b) by 39 days.

(21) Appl. No.: 16/339,954

(22) PCT Filed: Oct. 4, 2017

(86) PCT No.: PCT/TR2017/050478
§ 371 (c)(1),
(2) Date: Apr. 5, 2019

(87) PCT Pub. No.: WO2018/208252
PCT Pub. Date: Nov. 15, 2018

(65) Prior Publication Data
US 2020/0040681 A1    Feb. 6, 2020

(30) Foreign Application Priority Data
Oct. 6, 2016   (TR) .................................. 2016/14025

(51) Int. Cl.
*E21B 25/08*       (2006.01)
*E21B 49/02*       (2006.01)
*G01N 1/08*        (2006.01)

(52) U.S. Cl.
CPC .............. *E21B 25/08* (2013.01); *E21B 49/02* (2013.01); *G01N 1/08* (2013.01)

(58) Field of Classification Search
CPC ............ E21B 25/08; E21B 49/02; G01N 1/08
See application file for complete search history.

(56) References Cited

U.S. PATENT DOCUMENTS 4,449,594 A * 5/1984 Sparks .................... E21B 25/08
175/226
2055/0117977   6/2005 Rasumussen

FOREIGN PATENT DOCUMENTS

| CN | 101864916 | 10/2010 |
|---|---|---|
| CN | 104653176 | 5/2015 |
| CN | 205025400 | 2/2016 |
| JP | 3648641 | 5/2005 |

* cited by examiner

Primary Examiner — Michael R Wills, III
(74) Attorney, Agent, or Firm — Crose Law LLC; Bradley D. Crose

(57) ABSTRACT

The invention relates to a soil freezer (100) which allows undisturbed sampling by artificial soil freezing system in the field of geotechnical engineering. The invention particularly relates to local artificial ground freezer which allows undisturbed sampling in granular soil dominated layers (mostly sand and gravel) without damaging the natural conditions, and comprises a cooling unit (110), gas delivery pipes (113), a freezing piping system (120), pipes with steel shoes (121), end connection capillaries (122), a gas discharge-fill valve (112) and an installation apparatus (130).

1 Claim, 3 Drawing Sheets

UNDISTURBED SAMPLER FOR GRANULAR SOIL

RELATED TECHNICAL FIELD OF THE INVENTION

The invention relates to a soil freezer (100) which allows undisturbed sampling by artificial soil freezing system, in the field of geotechnical engineering.

The invention particularly relates to local artificial ground freezer which allows undisturbed sampling in granular soil dominated layers (mostly sand and gravel) without damaging the natural conditions, and comprises a cooling unit (110), gas delivery pipes (113), a freezing piping system (120), pipes with steel shoes (121), end connection capillaries (122), a gas discharge-fill valve (112) and an installation apparatus (130).

STATE OF THE ART

The known technique of sampling from the natural granular soils, disturbs the ground and leads to discontinuities. Therefore, the soil properties may completely change depending on the disturbance level during conventional sampling process.

The specimens taken from the required depth must reflect the natural properties properly, since they will be used in laboratory tests, in order to determine the different properties of the soil, such as structure of grains, gradation, stratification, permeability, swelling, collapse, compaction, liquefaction etc.

The type of the specimens changes depending on the laboratory experiment to be performed. Generally, two specimen types are used in sampling technique.

One of these types is the disturbed samples which have lost the natural state of their original soil structure due to external damage. These samples are not preferred for geotechnical laboratory experiments which provide the real values of the soil such as natural unit weight, natural moisture content, unconfined compression test and triaxial test etc.

Although there are different methods can be used to obtain disturbed sample, SPT (Standard Penetration Test) and observation pits are known as famous sampling methods applied in the field. Preliminary information relating the strength of soil layers on the field is obtained by SPT, as well as disturbed sample for experiments to be carried out. Disturbed sample is also obtained from observation pits excavated in areas near the ground surface.

The other sample type is the undisturbed ones. They are the soil samples that comprise all the structure, texture and properties of the soil's natural state. These specimens must be protected by some precautions against disturbance and kneading effects. They require high level of protection to minimize the damaging of the natural structure of the soil, and the outer sides are insulated to prevent water loss.

The penetration of the Shelby tube into the borehole is performed without applying any additional impact to obtain undisturbed sample. By this means, the soil samples can be acquired without disturbing its natural properties. However, this method of sampling can only be applied in cohesive, i.e. in clayed soils.

There are several methods used in the state of the art for obtaining undisturbed samples. However, there is no undisturbed sampling method on sand and/or gravel dominated insufficient binder containing (little or no clay content) soils. Instead of this, samples are reproduced or remolded with some acceptances in the laboratory environment by using disturbed ones. Moreover, prior to the triaxial compression test, the sample is supported by the cell pressure to allow the granular grains to carry each other. However, the unconfined compression test cannot be performed on granular soils in no event. Therefore, it is known that experimental results of granular samples produced in this way diverge from actual values. As a result, according to the usage of higher factor of safety values either overdesigns are made or unnecessary costs are seen.

After preliminary research about the state of the art, the patent document numbered "CN205025400" has been examined. The subject matter invention discloses a system which ensures that samples obtained from wells having ice or gas hydrate in the form of ice in them are taken out to the surface without being thawed. A fully enclosed DC compressor is used in this application. This compressor seems to have wall structure. The passage of fluid is blocked by continuously operating this refrigerating compressor and the sample is ensured not to be degraded from the bottom of well until the surface.

After preliminary research about the state of the art, the patent document numbered "JP3648641" has been examined. The subject matter invention discloses an in-situ sampling method of ground freezing performed for collecting undisturbed soil sample from layer of sand and layer of gravel, and a guiding tube used for employing the same method. This invention comprises a plurality of core tube insertion tube aligned about a freezing tube in the center.

After preliminary research about the state of the art, the patent document numbered "CN101864916" has been examined. The invention subject to the application comprises a method of core drilling and core sampling after freezing the borehole base. Liquid nitrogen is used as a freezer. The drill consists of the connections of inner and outer tubes and other details.

After preliminary research about the state of the art, the patent document numbered "US2012167698" has been examined. The invention subject to the application is used for sampling from ground water in areas with aquifer (pressurized underground water) sediments and underground water. In the closed system cooling is applied according to the Peltier principle.

Mentioned methods used in the state of the art are related with the liquid nitrogen or salt solution circulation, coring equipment including core barrel or coring of different type of material without soil.

Apart from that, there isn't any method for undisturbed soil sampling for granular soils located in the field, with respect to the state of the art. Since the granular material dominated the soil specimens reproduced in laboratory, they have not provided the natural conditions and problems occurred in the geotechnical parameters.

As a result, due to the above-mentioned problems and because of the inadequacy of the existing solutions, it has become necessary to make an improvement in the technical field.

Aim of the Invention

The most important object of the invention is that the sample preparation process in the laboratory environment is not required and this makes it possible to obtain undisturbed samples from the granular soils by preventing disturbance and deterioration behavior that may occur on the sample.

A further important object of the invention is to provide freezing at the natural conditions by penetrating the pipes with steel shoes into the ground before freezing.

Another object of the invention is to ensure that the mechanical and physical properties obtained from the samples reflect the actual values of the soils.

Another object of the invention is that the samples obtained in frozen form are in a structure such that it can directly be subjected to the unconfined compression test.

A further object of the invention is both the elimination of possible hazards of the liquid nitrogen by using gas as a circulation liquid inside the pipes, as well as reduction of costs.

Another object of the invention is that the desired drilling depth can be easily reached, and freezing process can be performed there.

Another object of the invention is to be able to obtain a frozen sample by standard core barrel (already attached on the drilling machine) from the coring area located in the middle region of the freezing piping system after freezing application, without the need for a new equipment design for the core process.

The other object of the invention is that it can be used not only on granular soils but also on any type of soils containing any level of moisture or water.

A further object of the invention is that the cooling gas (circulation liquid) prevents the heating of the equipment and core barrel.

Structural and characteristic specifications and all advantages of the invention will be understood more clearly by means of figures given below, and detailed descriptions written by referencing to those figures. Therefore, assessment should be done by taking these figures and detailed description into consideration.

REFERENCE NUMBERS

Figure 1:
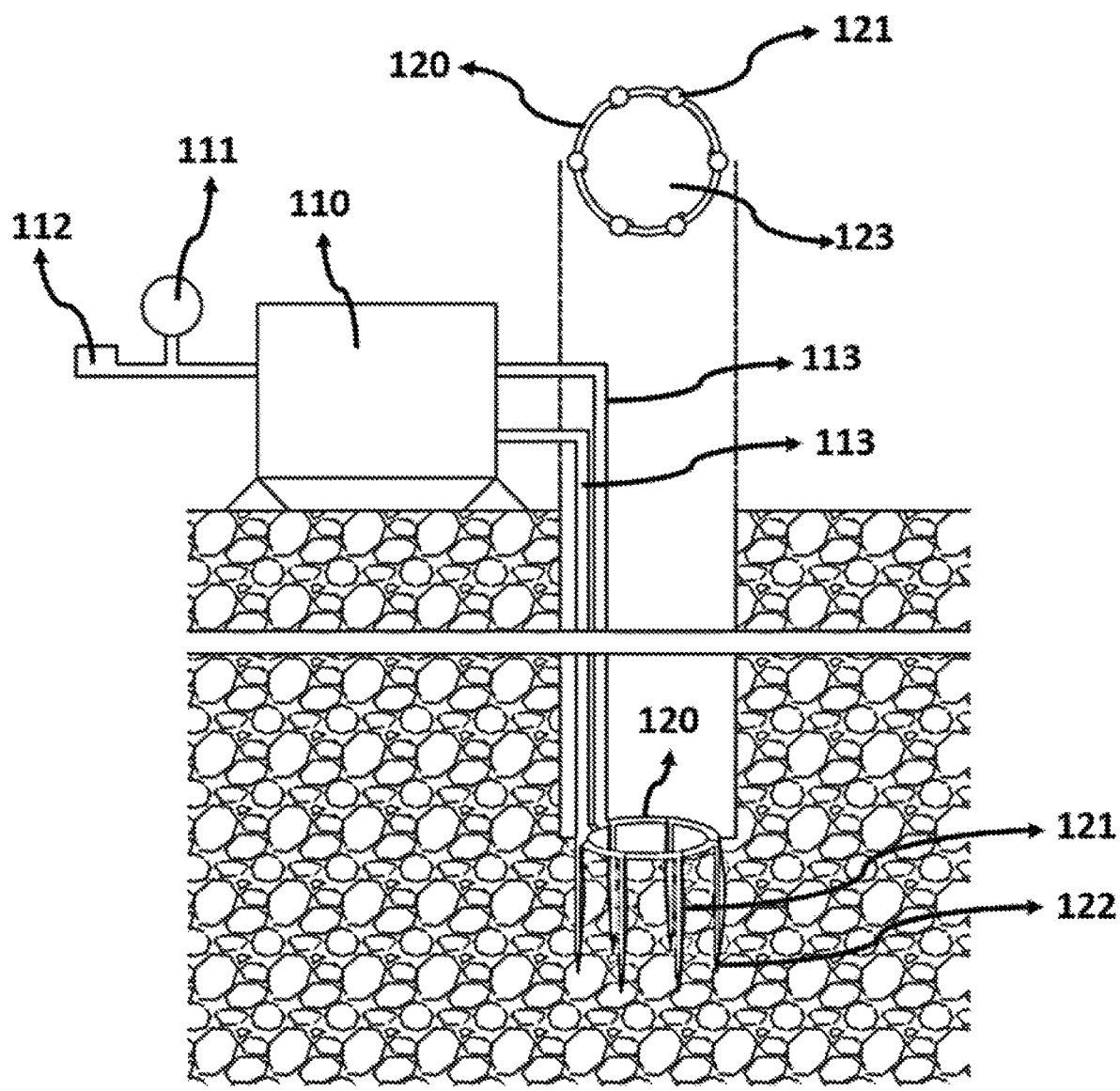
FIG. 1; is the illustration showing the general view of the system subject to the invention inside the borehole.
Figure 2:
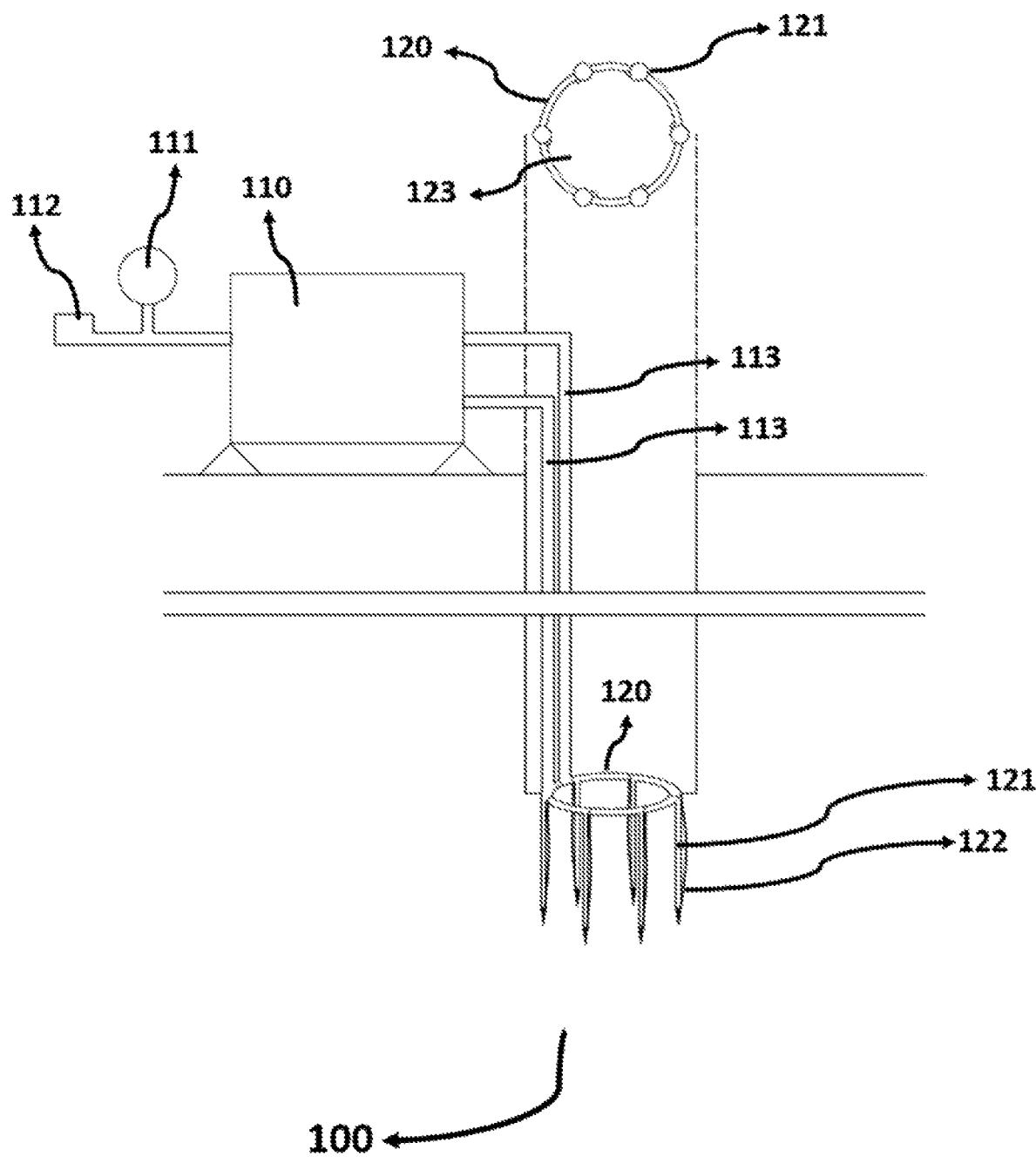
FIG. 2; is the illustration showing the general view of the system subject to the invention.
Figure 3:
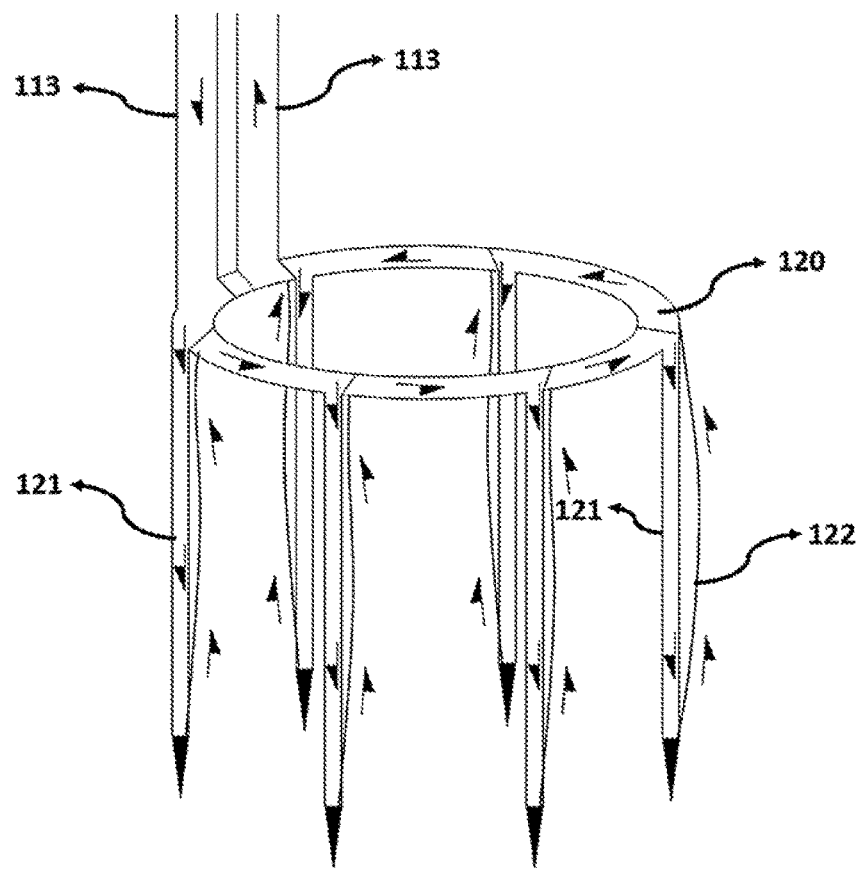
FIG. 3; is the illustration showing the view of gas distribution mechanism of the system subject to the invention.
Figure 4:
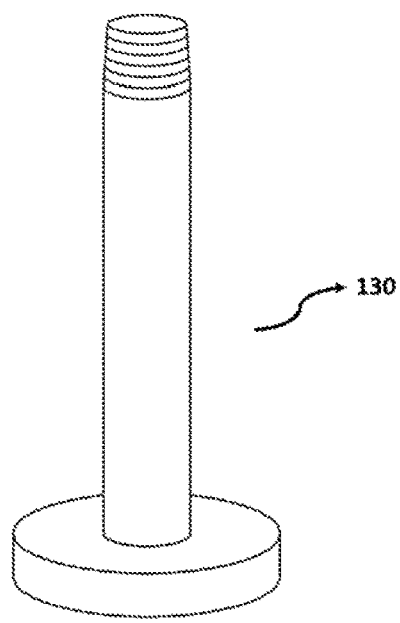
FIG. 4; is the illustration showing the view of installation apparatus of the system subject to the invention.

100. Soil Freezer
110. Cooling Unit
111. Pressure Sensor
112. Discharge-fill valve
113. Gas Delivery Pipe
120. Freezing Piping System
121. Pipes With Steel Shoes
122. End Connection Capillaries
123. Coring Area
130. Installation Apparatus

DESCRIPTION OF THE INVENTION

The soil freezer (100) subject to invention carries out the freezing process of soil before undisturbed sampling process from granular soils. The soil freezer (100) subject to invention freezes the area that is located inside the freezing piping system (120), not the entire floor. Thus, freezing process is performed before the sampling process and disturbance effect on the soil can be minimized by this way.

The soil freezer (100) subject to invention is, in general terms, comprised of the cooling unit (110), gas delivery pipes (113), freezing piping system (120), pipes with steel shoes (121), end connection capillaries (pipes with quite small diameter) (122) and the gas valve (112) components.

The cooling unit (110) comprises compressor, condenser, dryer and evaporator parts. The condensed and cooled circulation liquid inside the cooling unit (110), is sent to the gas delivery pipes (113). Freon gas is typically preferred as circulation liquid.

The gas delivery pipes (113) work as a conduit that ensure the transfer of the circulation liquid from outlet of the cooling unit (110) to the freezing piping system (120). In addition, delivery of the heated fluid coming from the freezing piping system (120) to the cooling unit (110) back again after lost its cooling effectiveness, is the other purpose of the gas delivery pipes (113). Production of high density polyethylene originated gas delivery pipes (113) are recommended to minimize the heat losses during transfer stage. Beside, efficiency can be increased by external insulation to be installed out of these gas delivery pipes (113). Since, pipes are produced in 1.5 m length standard drilling rod and they have end-to-end connection capability, undisturbed soil samples can be obtained from any desired depth. The gas delivery pipes (113) have sealed gaskets between their joints.

The freezing piping system (120) is manufactured from hollow stainless steel in diameter to provide sufficient amount of fluid transmission, while it must have sufficient strength during the placement and fixation stages of the pipes with steel shoes (121) to the floor. The production can be carried out by using other strong metals with high heat thermal conductivity. The inner diameter of grommet shaped freezing piping system (120) must be wide enough to taking sample by core barrel after freezing process. The cooled fluid is transferred to the pipes with steel shoes (121) just after the inlet location of freezing piping system (120). Then, fluid starts to one by one circulation process between the each pipes with steel shoes (121) via end connection capillaries (122). At this stage, while temperature of the fluid increases, the temperature of soil located around the pipes decreases and begins to freeze. After completion of circulation process circulation liquid is sent to the gas delivery pipes (113) from the outlet of freezing piping system (120) and then to the cooling unit (110) again. Finally, frozen soil in undisturbed case named as a coring area (123) is already available for coring process in the middle region of freezing piping system. On the other hand, there is no need to complicated or extra coring device instead of standard core barrel attached on the drilling machine.

The pipes with steel shoes (121) are produced by welding of conical shaped steels to the end portions of the hollow stainless-steel pipes having sufficient wall thickness against buckling. The production can also be carried out by using other metals which are strong enough vertical loads during placement stage and have resistance against corrosion. The penetration into the soil layers is easily performed thanks to the pipes with steel shoes (121). The cooled fluid coming from the inlet of the freezing piping system (120) cools the soil by flowing through the pipes with steel shoes (121) individually. The connection between the pipes with steel shoes (121) and freezing piping system (120) can be assembled by welding, clamping or threaded connection. There are sealing gaskets in the connection parts.

The fluid which is heated and transformed completely turns to the gaseous form is transferred to the grommet shaped freezing piping system (120) via end connection capillaries (122) just after each pipes with steel shoes. By this means, the partially cooling operation is realized inside the end connection capillaries such as the logic behind the serpentine usage in cooling equipment. The connection of end connection capillaries (122) to the pipes with steel shoes (121) and the freezing piping system (120) can be done by welding, clamping or threaded connections. There are sealing gaskets in the connection parts.

The gas valve (112) provides the inlet location to the gas in the system prior to the artificial soil freezing operation or the discharge of the circulation liquid prior to the disassembly of the system. There is also a pressure sensor (111) that indicates the gas pressure. Since the cooling operation would not be effective in case of decrease in pressure, gas filling from the gas valve (112) is performed, and when the pressure rises, the required amount of gas is discharged from the system. Also, external thermocouples or different type of temperature sensors can be adopted to the system at any position to validate the freezing process.

The installation apparatus (130) is used to push the freezing piping system (120) and also pipes with steel shoes (121) to the desired depth inside the borehole. The bottom section of the installation apparatus (130) must be manufactured from a rigid circular steel plate which has sufficient strength and other side must be in threaded form within the scope of proper connection to the rod of drilling machine.

The circular steel plate is fixed to the freezing piping system (120), before all of the pipes with steel shoes (121) are pushed to the ground simultaneously with dynamic effect caused by the SPT hammer, the external pile rammer, vibration sources or only pushing force of the drilling machine from the ground surface in accordance with the ground resistance.

After the pipes with steel shoes (121) have been penetrated to the required depth, the installation apparatus (130) is removed from the borehole. After freezing, sample is taken by the core barrel from the open section of coring area (123).

Cooling system is switched off, circulation liquid is collected from the gas valve (112) and then system should be left for thawing, after undisturbed soil sampling. The freezing piping system (120) is removed from the borehole by means of the gas delivery pipes (113). If the strength of the gas delivery pipes (113) would not be sufficient to remove the system from the soil, freezing piping system (120) and pipes with steel shoes (121) can be removed via previously attached cables in secure.

The invention claimed is:

1. A soil freezer (100) for sampling from granular soils, characterized in that the soil freezer comprises;
    a cooling unit (110), which includes a discharge-fill valve (112) that delivers a coolant medium, which is condensed therein and has a temperature of which is reduced into gas delivery pipes (113), and provides an introduction of refrigerant gas which is a fluid in undisturbed sampling by the soil freezer prior to soil sampling or discharge of circulating gas prior to disassembly of the soil freezer, and a pressure sensor (111) that indicates a gas pressure,
    a freezing piping system (120), which comprises a pipe with steel shoes (121) fixed on the freezing piping system (120), having a hollow structure in diameter to provide fluid transmission with sufficient flow, allowing ground penetration to be performed readily, and allowing the fluid that is cooled in the cooling unit, coming from the freezing piping system (120) to flow through steel shoes (121) and to cool the ground, and which ensures that the cooled fluid is transferred to the pipes with the steel shoes (121) and that the fluid cooling the ground is transferred back to the delivery pipes (113) again when the temperature of the fluid rises, wherein freezing piping system (120) enables frozen sampling by a core barrel already present in a drilling machine from a coring area (123) located in the middle after the process of ground freezing, having an inner diameter large enough to allow the core barrel to obtain sample after freezing process,
    an installation apparatus (130), an end portion of which is manufactured from a rigid circular steel plate having sufficient strength, wherein the installation apparatus is used to push the freezing piping system (120) and the pipes with steel shoes (121) associated thereto into the desired depth.

* * * * *